(12) United States Patent
Wu et al.

(10) Patent No.: US 9,870,198 B2
(45) Date of Patent: Jan. 16, 2018

(54) METHOD AND SYSTEM OF ILLUSTRATING AUDIO SIGNAL STRENGTH

(71) Applicant: Tencent Technology (Shenzhen) Company Limited, Shenzhen (CN)

(72) Inventors: Liang Wu, Shenzhen (CN); Pinlin Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/188,896

(22) Filed: Jun. 21, 2016

(65) Prior Publication Data

US 2016/0299741 A1   Oct. 13, 2016

Related U.S. Application Data

(63) Continuation of application No. PCT/CN2014/094168, filed on Dec. 18, 2014.

(30) Foreign Application Priority Data

Apr. 8, 2014   (CN) .......................... 2014 1 0138758

(51) Int. Cl.
*G06F 3/048* (2013.01)
*G06F 3/16* (2006.01)
(Continued)

(52) U.S. Cl.
CPC .......... *G06F 3/167* (2013.01); *G06F 3/04842* (2013.01); *G06F 3/165* (2013.01); *G06T 11/206* (2013.01); *G06T 2200/24* (2013.01)

(58) Field of Classification Search
CPC combination set(s) only.
See application file for complete search history.

(56) References Cited

U.S. PATENT DOCUMENTS 7,225,405 B1 *  5/2007  Barrus .................. G06F 3/0481
                                                707/E17.009
7,610,110 B1 * 10/2009  Johnston .................. H04S 7/40
                                                        381/58

(Continued)

FOREIGN PATENT DOCUMENTS

CN   102033800 A   4/2011
CN   102474232 A   5/2012

(Continued)

OTHER PUBLICATIONS

Tencent Technology, ISRWO, PCT/CN2014/094168, dated Mar. 16, 2015, 9 pgs.

(Continued)

*Primary Examiner* — Hien Duong
(74) *Attorney, Agent, or Firm* — Morgan, Lewis & Bockius LLP

(57) ABSTRACT

A method of illustrating audio signal strength includes at a portable computer device having one or more processors and memory storing programs executed by the one or more processors, collecting audio signal using the portable computer device; determining strength of the collected audio signal; computing an illustrative scale that corresponds to the audio signal strength using a mapping function; and superimposing the audio signal strength with the illustrative scale on a graphic area, wherein the graphic area includes an initial sub-area.

15 Claims, 3 Drawing Sheets

(51) Int. Cl.
   *G06F 3/0484*   (2013.01)
   *G06T 11/20*   (2006.01)

(56) References Cited

U.S. PATENT DOCUMENTS

| | | | |
|---|---|---|---|
| 2008/0031464 A1 | 2/2008 | Nielsen et al. | |
| 2011/0029874 A1 | 2/2011 | Profitt | |
| 2014/0112483 A1* | 4/2014 | Etter | ............ H03G 3/3005 381/56 |

FOREIGN PATENT DOCUMENTS

| | | |
|---|---|---|
| CN | 103198846 A | 7/2013 |
| CN | 103345376 A | 10/2013 |
| CN | 104142879 A | 11/2014 |

OTHER PUBLICATIONS

Tencent Technology, IPRP, PCT/CN2014/094168, dated Oct. 12, 2016, 7 pgs.

* cited by examiner

METHOD AND SYSTEM OF ILLUSTRATING AUDIO SIGNAL STRENGTH

RELATED APPLICATIONS

This application is a continuation application of PCT Patent Application No. PCT/CN2014/094168, entitled "METHOD AND SYSTEM OF ILLUSTRATING AUDIO SIGNAL STRENGTH" filed on Dec. 18, 2014, which claims priority to Chinese Patent Application No. 201410138758.1, entitled "METHOD, APPARATUS AND USER TERMINAL FOR PROMPTING AUDIO LOUDNESS" filed on Apr. 8, 2014, both of which are incorporated by reference in their entirety.

TECHNICAL FIELD

The present application relates to the field of computer application processing, and in particular, to a method and a system of illustrating audio signal strength.

BACKGROUND

Computer device and networking technologies allow people to communicate instantly and conveniently. Using a portable device, a personal computer, a vehicle-carried terminal device, a smart wearable device, etc., a person can easily transmit and receive information including text, audio, and video.

Current technology in audio communication includes: detecting whether an audio recording function is triggered by the user, collecting the audio signal using a terminal microphone, processing the collected audio signal, and saving or transmitting the processed audio signal. However, the current technology does not have efficient audio signal feedback scheme, for example, a feedback scheme on audio signal strength. It is difficult for a user to determine whether an audio recording is success, or the strength of the recorded audio signal is satisfying. The deficiency of feedback on audio signal strength causes unnecessary re-recordings, which are time consuming for the user and waste of system resources.

SUMMARY

In accordance with some implementations of the present application, a method of illustrating audio signal strength comprises at a portable computer device having one or more processors and memory storing programs executed by the one or more processors, collecting an audio signal using the portable computer device; determining strength of the collected audio signal; computing an illustrative scale that corresponds to the audio signal strength using a mapping function; and superimposing the audio signal strength with the illustrative scale on a graphic area, wherein the graphic area includes an initial sub-area.

In some embodiments, the method of illustrating audio signal strength further comprises detecting whether an audio recording button on the portable computer device is pressed for collecting the audio signal, wherein the audio recording button is displayed within the initial sub-area.

In some embodiments, dimensions of the graphic area and the initial sub-area are configured according to screen pixels of the portable computer device.

In some embodiments, the graphic area, the initial sub-area, and illustration of the audio signal strength are configured to be concentric circles, where the circle that illustrates the audio signal strength has a radius that equals to the illustrative scale.

In some embodiments, the mapping function is set as $R = 2r_{max}\sqrt{x} - r_{max}x + r_{button}$, wherein $x \in [0,1]$, R denotes the illustrative scale of the audio signal strength, x denotes the audio signal strength, $r_{button}$ denotes the dimension of the initial sub-area, and $r_{max}$ denotes the dimension of the graphic area subtracted by the dimension of the initial sub-area.

In some embodiments, the graphic area is drawn in a first color, and the illustration of the audio signal strength is drawn in a second color.

In accordance with some implementations of the present application, a system of illustrating audio signal strength, comprises one or more processors; memory; and one or more programs stored in the memory and configured for execution by the one or more processors, the one or more programs including instructions for: collecting an audio signal using a portable computer device; determining strength of the collected audio signal; computing an illustrative scale that corresponds to the audio signal strength using a mapping function; and superimposing the audio signal strength with the illustrative scale on a graphic area, wherein the graphic area includes an initial sub-area.

In accordance with some implementations of the present application, a non-transitory computer readable storage medium, storing one or more programs for execution by one or more processors of a system of illustrating audio signal strength includes instructions for collecting an audio signal using a portable computer device; determining strength of the collected audio signal; computing an illustrative scale that corresponds to the audio signal strength using a mapping function; and superimposing the audio signal strength with the illustrative scale on a graphic area, wherein the graphic area includes an initial sub-area.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

To illustrate the technical solutions in the embodiments of the present application or in the prior art more clearly, accompanying drawings required for describing the embodiments or the prior art are briefly introduced in the following. The accompanying drawings in the following description are merely some embodiments of the present invention, and persons of ordinary skills in the art may further obtain other drawings according to these accompanying drawings without creative efforts.

DETAILED DESCRIPTION

The technical solutions in the embodiments of the present application are clearly and completely described in the following with reference to the accompanying drawings. Evidently, the embodiments to be described are merely part of rather than all of the embodiments of the present application. All other embodiments obtained by persons of ordinary skill in the art based on the embodiments of the present application without creative efforts shall fall within the protection scope of the present application.

Figure 1:
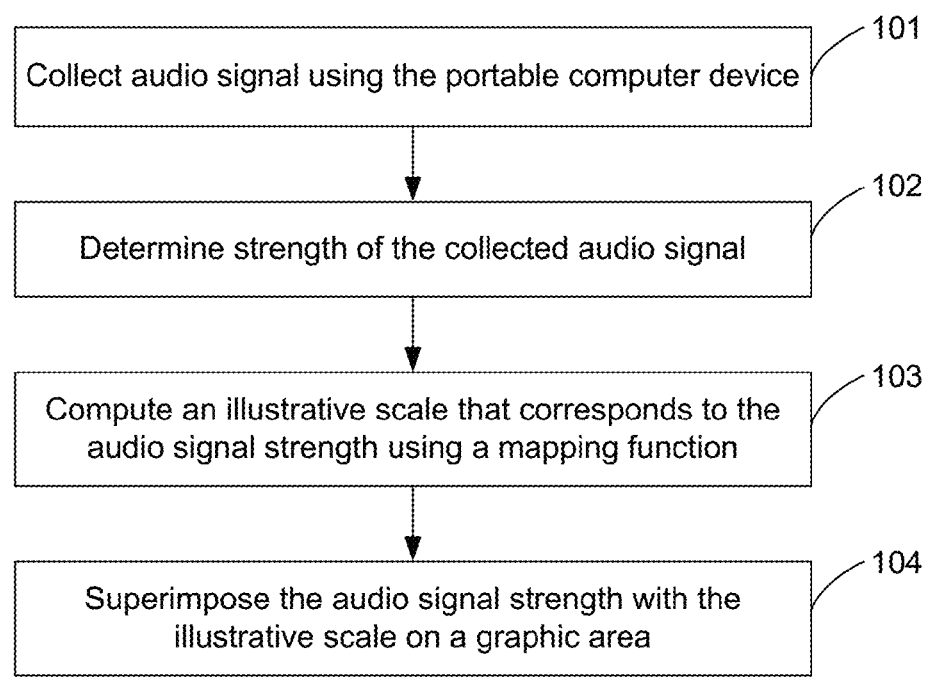
FIG. 1 is an exemplary method of illustrating audio signal strength according to some embodiments of the present application.

FIG. 1 is an exemplary method of illustrating audio signal strength according to some embodiments of the present application.

At step S101, audio signal is collected using the portable computer device. When a user needs to record audio, launch an audio conversation, or launch an instant audio communication, the user may press an audio recording button to start collecting an audio signal using the embedded microphone.

At step S102, a determination is made as to the strength of the collected audio signal. The strength of audio signal may be the sensed volume of the audio signal recognized by human beings, and is related to the frequency of the audio signal. The unit of the strength is sone. 40 dB audio signal corresponds to the strength of one sone. In general, the strength of audio signal is doubled when the volume of a 1000 Hz audio signal increases by 10 dB.

At step S103, an illustrative scale that corresponds to the audio signal strength is computed using a mapping function. The mapping function may be obtained by analyzing the relationship between the illustrative scale of an object and the dimension of a graphic area used to display the object. For example, for a graphic area used to illustrate audio signal strength, the variations of the illustrative scale is relatively large when the strength is low, while the variations of the illustrative scale is relatively small when the strength is high. An illustration of an object may be in any geometric shape such as square, circle, etc.

At step S104, the audio signal strength with the illustrative scale is superimposed on a graphic area, where the graphic area includes an initial sub-area.

In some embodiments, the audio recording button is displayed within the initial sub-area.

Yet in some embodiments, dimensions of the graphic area and the initial sub-area are configured according to screen pixels of the portable computer device.

Figure 2:
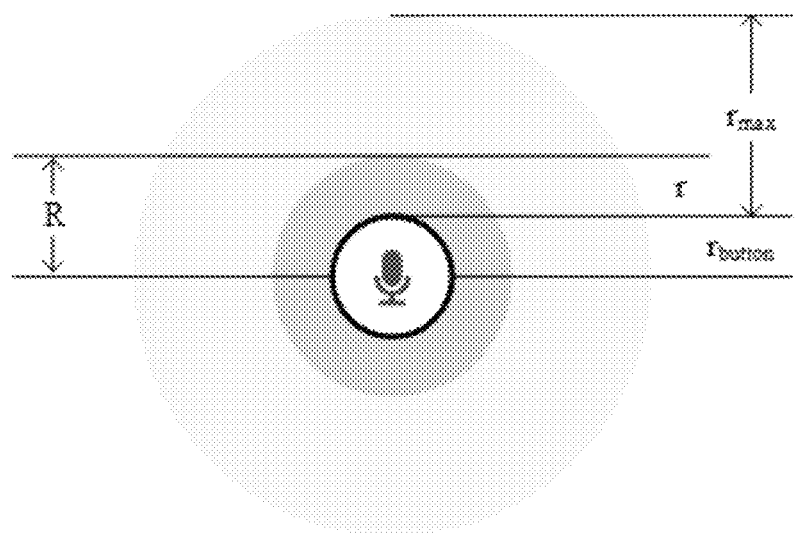
FIG. 2 is an exemplary diagram of audio signal strength illustration interface according to some embodiments of the present application.

In some embodiments, the graphic area, the initial sub-area, and illustration of the audio signal strength are configured to be concentric circles, where the circle that illustrates the audio signal strength has a radius that equals to the illustrative scale, as shown in FIG. 2.

FIG. 2 is an exemplary diagram of audio signal strength illustration interface according to some embodiments of the present application.

In some embodiments, the mapping function is set as $R=2r_{max}\sqrt{x}-r_{max}x+r_{button}$, wherein $x \in [0,1]$, R denotes the illustrative scale of the audio signal strength, x denotes the audio signal strength, $r_{button}$ denotes the dimension of the initial sub-area, and $r_{max}$ denotes the dimension of the graphic area subtracted by the dimension of the initial sub-area.

In some embodiments, the graphic area is drawn in a first color, and the illustration of the audio signal strength is drawn in a second color. As shown in FIG. 2, for example, the color of the audio signal strength illustration is darker than the color of the graphic area.

Figure 3:
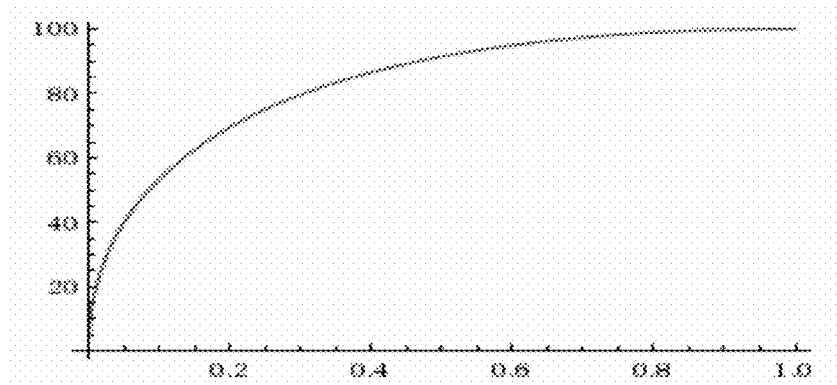
FIG. 3 is an exemplary diagram illustrating a relationship between the illustrative scale and the audio signal strength according to some embodiments of the present application.

FIG. 3 is an exemplary diagram illustrating a relationship between the illustrative scale and the audio signal strength according to some embodiments of the present application. The horizontal axis denotes the audio signal strength, and the vertical axis denotes the illustrative scale that corresponds to the audio signal strength.

According to the present invention, the strength of audio signal is visualized on the graphic area, and therefore, allows the user to determine whether an audio recording is successful, or whether the quality of the recorded audio is satisfying. Further, the feedback scheme of the audio signal strength according to the present invention is instant and more efficient than current technologies.

Figure 4:
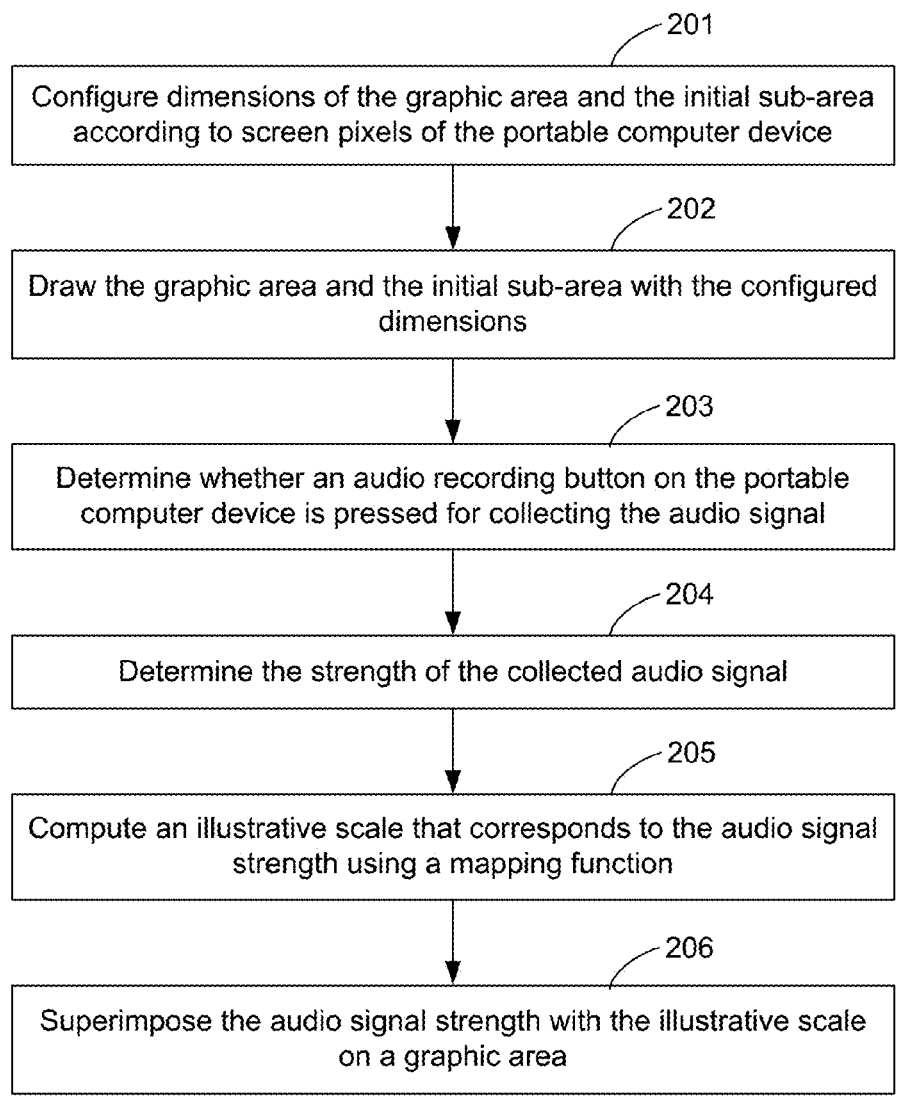
FIG. 4 is an exemplary method of illustrating audio signal strength according to some other embodiments of the present application.

FIG. 4 is an exemplary method of illustrating audio signal strength according to some other embodiments of the present application.

At step S201, dimensions of the graphic area and the initial sub-area are configured according to screen pixels of the portable computer device.

At step S202, the graphic area and the initial sub-area are drawn with the configured dimensions.

At step S203, a determination is made as to whether an audio recording button on the portable computer device is pressed for collecting the audio signal.

At step S204, audio signal is collected, and a determination is made as to the strength of the collected audio signal.

At step S205, an illustrative scale that corresponds to the audio signal strength is computed using a mapping function.

At step S206, the audio signal strength with the illustrative scale is superimposed on a graphic area.

In some embodiments, the graphic area and the illustration of audio signal strength are drawn in different colors.

Figure 5:
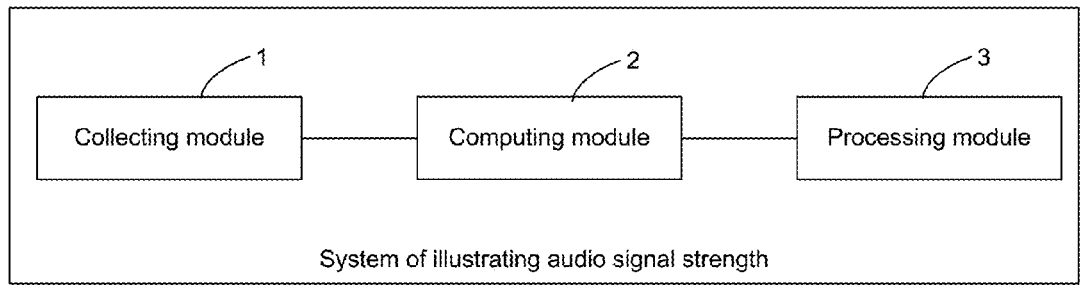
FIG. 5 is an exemplary diagram of a system of illustrating audio signal strength according to some embodiments of the present application.

FIG. 5 is an exemplary diagram of a system of illustrating audio signal strength according to some embodiments of the present application. The system of illustrating audio signal strength may be configured in a cell phone, a laptop, a personal computer, a smart wearable device etc. The system of illustrating audio signal strength may include a collection module 1 configured to collect audio signal, and determine the strength of the collected audio signal; a computing module 2 configured to compute an illustrative scale that corresponds to the audio signal strength using a mapping function; and a processing module 3 configured to superimpose the audio signal strength with the illustrative scale on a graphic area.

Figure 6:
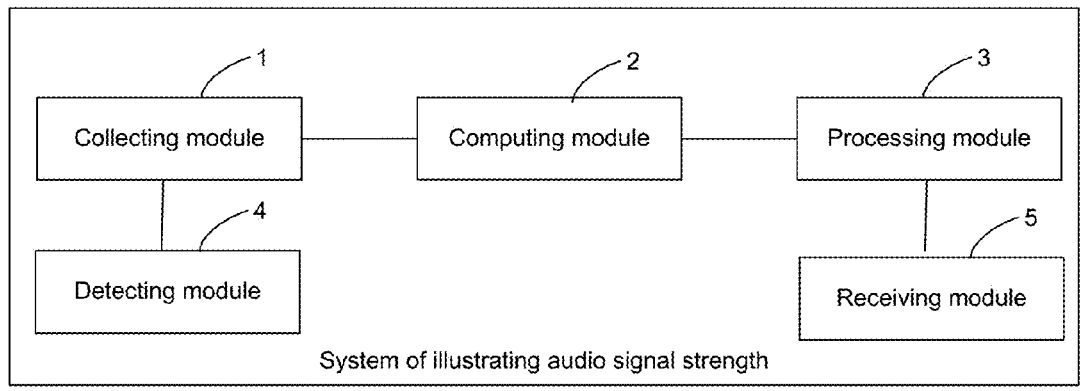
FIG. 6 is an exemplary diagram of a system of illustrating audio signal strength according to some other embodiments of the present application.

FIG. 6 is an exemplary diagram of a system of illustrating audio signal strength according to some other embodiments of the present application. The system of illustrating audio signal strength according to the embodiment may include a collecting module 1 configured to collect audio signal, and determine the strength of the collected audio signal; a computing module 2 configured to compute an illustrative scale that corresponds to the audio signal strength using a mapping function; a processing module 3 configured to superimpose the audio signal strength with the illustrative scale on a graphic area; a detecting module 4 configured to detect whether an audio recording button on the portable computer device is pressed for collecting the audio signal;

and a receiving module 5 configured to receive dimensions of the graphic area and the initial sub-area configured according to screen pixels of the portable computer device.

Figure 7:
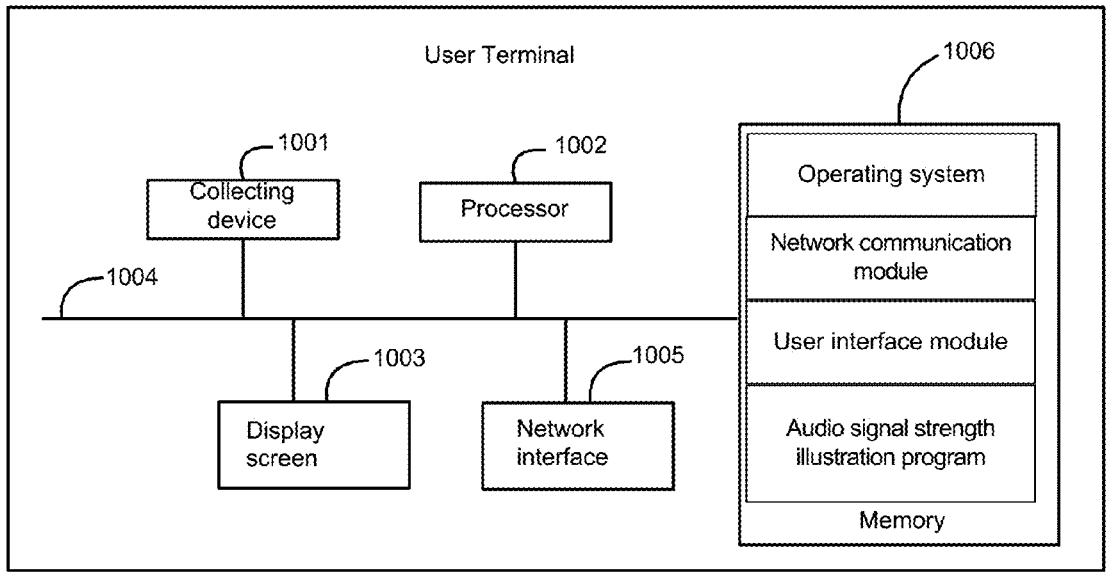
FIG. 7 is an exemplary diagram of a user terminal according to some embodiments of the present application.

FIG. 7 is an exemplary diagram of a user terminal according to some embodiments of the present application. The user terminal may comprise a collecting device 1001, a processor 1002, such as a CPU (Central Processing Unit), and a display screen 1003, at least one communication bus 1004, at least one network interface 1005, and a memory 1006. The communication bus 1004 may be used to enable the connection and communication among these components. The network interface 1005 may comprise a standard wired interface and a wireless interface (such as WI-FI, a mobile communication interface and the like). The memory 1006 may be a high-speed RAM (Random Access Memory), and a non-volatile memory, such as at least one disc memory. In some embodiments, the memory 1006 may be at least one memory disposed at a distance from the above processor 1002. As shown in FIG. 7, the memory 1006 as computer storage medium stores an operating system, network communication module, an audio signal strength illustration system and the like.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of illustrating audio signal strength comprising:
   at a portable computer device having one or more processors and memory storing programs executed by the one or more processors,
   collecting audio signal using the portable computer device;
   determining strength of the collected audio signal;
   computing an illustrative scale that corresponds to the audio signal strength using a mapping function; and
   superimposing the audio signal strength with the illustrative scale on a graphic area, wherein the graphic area includes an initial sub-area,
   wherein the mapping function is set as $R=2r_{max}\sqrt{x}-r_{max}x+r_{button}$, wherein $x \in [0,1]$, R denotes the illustrative scale of the audio signal strength, x denotes the audio signal strength, $r_{button}$ denotes a dimension of the initial sub-area, and $r_{max}$ denotes the dimension of the graphic area subtracted by the dimension of the initial sub-area.

2. The method of illustrating audio signal strength of claim 1, further comprises:
   detecting whether an audio recording button on the portable computer device is pressed for collecting the audio signal, wherein the audio recording button is displayed within the initial sub-area.

3. The method of illustrating audio signal strength of claim 1, wherein dimensions of the graphic area and the initial sub-area are configured according to screen pixels of the portable computer device.

4. The method of illustrating audio signal strength of claim 1, wherein
the graphic area, the initial sub-area, and illustration of the audio signal strength are configured to be concentric circles, where the circle that illustrates the audio signal strength has a radius that equals to the illustrative scale.

5. The method of illustrating audio signal strength of claim 1, wherein
the graphic area is drawn in a first color, and the illustration of the audio signal strength is drawn in a second color.

6. A system of illustrating audio signal strength, comprising:
one or more processors;
memory; and
one or more programs stored in the memory and configured for execution by the one or more processors, the one or more programs including instructions for:
collecting audio signal using a portable computer device;
determining strength of the collected audio signal;
computing an illustrative scale that corresponds to the audio signal strength using a mapping function; and
superimposing the audio signal strength with the illustrative scale on a graphic area, wherein the graphic area includes an initial sub-area,
wherein the mapping function is set as $R=2r_{max}\sqrt{x}-r_{max}x+r_{button}$, wherein $x \in [0,1]$, R denotes the illustrative scale of the audio signal strength, x denotes the audio signal strength, $r_{button}$ denotes the dimension of the initial sub-area, and $r_{max}$ denotes the dimension of the graphic area subtracted by the dimension of the initial sub-area.

7. The system of illustrating audio signal strength of claim 6, wherein the one or more programs further comprises:
detecting whether an audio recording button on the portable computer device is pressed for collecting the audio signal, wherein the audio recording button is displayed within the initial sub-area.

8. The system of illustrating audio signal strength of claim 6, wherein
dimensions of the graphic area and the initial sub-area are configured according to screen pixels of the portable computer device.

9. The system of illustrating audio signal strength of claim 6, wherein
the graphic area, the initial sub-area, and illustration of the audio signal strength are configured to be concentric circles, where the circle that illustrates the audio signal strength has a radius that equals to the illustrative scale.

10. The system of illustrating audio signal strength of claim 6, wherein
the graphic area is drawn in a first color, and the illustration of the audio signal strength is drawn in a second color.

11. A non-transitory computer readable storage medium, storing one or more programs for execution by one or more processors of a system of illustrating audio signal strength including instructions for:
collecting audio signal using a portable computer device;
determining strength of the collected audio signal;
computing an illustrative scale that corresponds to the audio signal strength using a mapping function; and
superimposing the audio signal strength with the illustrative scale on a graphic area, wherein the graphic area includes an initial sub-area,
wherein the mapping function is set as $R=2r_{max}\sqrt{x}-r_{max}x+r_{button}$, wherein $x \in [0,1]$, R denotes the illustrative scale of the audio signal strength, x denotes the audio signal strength, $r_{button}$ denotes the dimension of the initial sub-area, and $r_{max}$ denotes the dimension of the graphic area subtracted by the dimension of the initial sub-area.

12. The non-transitory computer readable storage medium of claim 11, wherein the one or more programs further comprises:
detecting whether an audio recording button on the portable computer device is pressed for collecting the audio signal, wherein the audio recording button is displayed within the initial sub-area.

13. The non-transitory computer readable storage medium of claim 11, wherein
dimensions of the graphic area and the initial sub-area are configured according to screen pixels of the portable computer device.

14. The non-transitory computer readable storage medium of claim 11, wherein
the graphic area, the initial sub-area, and illustration of the audio signal strength are configured to be concentric circles, where the circle that illustrates the audio signal strength has a radius that equals to the illustrative scale.

15. The non-transitory computer readable storage medium of claim 11, wherein
the graphic area is drawn in a first color, and the illustration of the audio signal strength is drawn in a second color.

* * * * *